US011639206B2

(12) United States Patent
Slight et al.

(10) Patent No.: US 11,639,206 B2
(45) Date of Patent: May 2, 2023

(54) AIRFLOW DEFLECTOR

(71) Applicant: McLaren Automotive Limited, Woking (GB)

(72) Inventors: Arthur Slight, Surrey (GB); Gary Ahlin, London (GB)

(73) Assignee: McLaren Automotive Limited, Woking (GB)

( * ) Notice: Subject to any disclaimer, the term of this patent is extended or adjusted under 35 U.S.C. 154(b) by 36 days.

(21) Appl. No.: 17/335,681

(22) Filed: Jun. 1, 2021

(65) Prior Publication Data
US 2021/0371018 A1 Dec. 2, 2021

(30) Foreign Application Priority Data

Jun. 2, 2020 (GB) ...................................... 2008295

(51) Int. Cl.
*B62D 35/00* (2006.01)
*B62D 25/12* (2006.01)
(52) U.S. Cl.
CPC ............ *B62D 35/005* (2013.01); *B62D 25/12* (2013.01)
(58) Field of Classification Search
CPC ...... B62D 25/10; B62D 25/105; B62D 25/12; B62D 35/00; B62D 35/005
USPC .......................................... 296/180.1, 193.11
See application file for complete search history.

(56) References Cited

U.S. PATENT DOCUMENTS

| 5,630,640 | A  | * | 5/1997  | Fior       | B60J 7/22 |
|           |    |   |         |            | 296/91    |
| 6,926,346 | B1 | * | 8/2005  | Wong       | B62D 35/005 |
|           |    |   |         |            | 296/180.1 |
| 10,351,181 | B2 | * | 7/2019  | McKillen   | B62D 35/00 |
| 10,843,533 | B2 | * | 11/2020 | Biancalana | B60J 1/2005 |
| 11,352,076 | B2 | * | 6/2022  | Kay        | B62D 37/02 |
| 2008/0079285 | A1 | * | 4/2008 | Ueda       | B62J 17/04 |
|           |    |   |         |            | 296/180.1 |

(Continued)

FOREIGN PATENT DOCUMENTS

DE        3202812      8/1983
DE    102015213787    1/2017

(Continued)

OTHER PUBLICATIONS

GB Application, GB 2008295.4 , "Search Report", dated Oct. 2, 2020, 3 pages.

*Primary Examiner* — Jason S Daniels
(74) *Attorney, Agent, or Firm* — Kilpatrick Townsend & Stockton LLP

(57) ABSTRACT

An example vehicle includes a passenger compartment; a nose region forwards of the passenger compartment, the nose region having a top surface; and an airflow deflector positioned on the top surface of the nose region, the airflow deflector comprising a first panel projecting from the top surface of the nose region; and a second panel coupled to the first panel, the second panel being spaced from the first panel to form a channel between the first and second panels, the channel having an inlet facing towards the top surface of the nose region so that a rearwardly moving airflow incident on the first panel is directed towards the channel inlet and an outlet facing away from the top surface of the nose region so that air flowing through the outlet is directed in an upwards direction, the upwards airflow causing disruption to a rearward airflow moving towards the passenger compartment.

23 Claims, 9 Drawing Sheets

(56) References Cited

U.S. PATENT DOCUMENTS

2019/0233022 A1   8/2019   Biancalana

FOREIGN PATENT DOCUMENTS

EP          3517414 A1 *  7/2019   ............. B62D 25/12
GB          2003801        3/1979

* cited by examiner

AIRFLOW DEFLECTOR

This application claims priority to GB Patent Application No. 2008295.4, titled "Airflow Deflector," filed Jun. 2, 2020, the entirety of which is hereby incorporated by reference.

This invention relates to a vehicle comprising an airflow deflector causing a redirection of an airflow moving towards a passenger compartment.

There are some cars that are not fitted with a roof. These cars may be permanently roofless or temporarily roofless. For instance, many racing cars do not have a roof at all whereas some sports cars have a retractable roof. These vehicles can offer an improved driving experience because the passenger compartment is open to the sky. Many of these vehicles still have a front windscreen, especially those cars that are sports cars rather than race cars, because otherwise the occupants tend to be bombarded with an oncoming rearwardly moving airflow when the car is in motion. This airflow can also include foreign objects such as stones or insects. It is undesirable for these to strike the occupants of the passenger compartment.

If the front windscreen is removed, then it is common for the occupants of the vehicle to wear helmets to protect themselves from the rearwardly moving airflow and any flying objects it contains. However, in situations where a car is not being driven in a race situation it is undesirable for the occupants to need to always wear helmets. For instance, if the car is a sports car then whilst the car may be driven enthusiastically at times during other periods the car may be driven more sedately. In these situations, it would be desirable for the occupants to be able to drive the car without needing to wear helmets.

Some vehicles have a stub windscreen which acts to provide some disruption to airflow entering the passenger compartment. However, these tend not to be effective above certain speeds where the stub windscreen struggles to redirect enough airflow to effectively disrupt the airflow moving towards the passenger compartment.

Therefore, it would be desirable to have a vehicle with an improved system for redirecting a rearward airflow moving towards a passenger compartment.

According to a first aspect of the present invention there is provided a vehicle comprising: a passenger compartment; a nose region forwards of the passenger compartment, the nose region having a top surface; and an airflow deflector positioned on the top surface of the nose region, the airflow deflector comprising a first panel projecting from the top surface of the nose region; and a second panel coupled to the first panel, the second panel being spaced from the first panel to form a channel between the first and second panels, the channel having an inlet facing towards the top surface of the nose region so that a rearwardly moving airflow incident on the first panel is directed towards the channel inlet and an outlet facing away from the top surface of the nose region so that air flowing through the outlet is directed in an upwards direction, the upwards airflow causing disruption to a rearward airflow moving towards the passenger compartment.

The airflow deflector may be moveable between a lowered configuration and a raised configuration, the airflow deflector may project minimally from the top surface of the nose region when in the lowered configuration and the airflow deflector may project maximally from the top surface of the nose region when in the raised configuration. The airflow deflector may be housed completely within the nose region when in the lowered configuration. The airflow deflector may be moveable between the lowered configuration and the raised configuration by sliding relative to the top surface of the nose region in an upward direction.

The channel may have a length running between the inlet of the channel and the outlet of the channel, the channel may have a minimum width along the length of the channel running between the first and second panels, and the inlet may have a width greater than the minimum width of the channel. The channel may have a length running between the inlet of the channel and the outlet of the channel, the channel may have a width running between the first and second panels, and the channel may have a reducing width between the inlet and a midpoint of the length of the channel. The channel may have a length running between the inlet of the channel and the outlet of the channel, the channel may have a width running between the first and second panels, and the channel may have a reducing width between the inlet and a midpoint of the length of the channel. The channel may have a length running between the inlet of the channel and the outlet of the channel, the channel may have a width running between the first and second panels, and the channel may have a constant width between a midpoint of the length of the channel and the outlet. The channel may have a length running between the inlet of the channel and the outlet of the channel, and the channel may be curved along the length of the channel. The inlet of the channel may be oriented in a forward direction. The outlet of the channel may be oriented in a forward direction.

The second panel may have a curved cross-section. A leading edge of the second panel may define one side of the inlet of the channel, a trailing edge of the second panel may define one side of the outlet of the channel and an intermediate portion between the leading and trailing edges, the leading and trailing edges of the second panel may be positioned closer to a front of the vehicle than the intermediate portion of the second panel.

The second panel may have a cross-section that has an aerofoil profile. A leading edge of the aerofoil may face the top surface of the nose region and a trailing edge of the aerofoil may face away from the top surface of the nose region. The leading edge of the aerofoil may be thicker than the trailing edge of the aerofoil.

The second panel may be coupled to the first panel so that the second panel is spaced from the top surface of the nose region when the first panel projects from the top surface of the nose region. The second panel may be connected to the nose region via the first panel. The first panel may have a cross-section with a depth greater near the outlet of the channel than the inlet of the channel. A surface of the first panel which faces the channel may be at least partially curved. The first and second panels may be arcuate along a lateral direction of the vehicle.

The airflow deflector comprises one or more vanes, the vane(s) coupling the second panel to the first panel. The airflow deflector may comprise a plurality of vanes, each vane being spaced from each other along a length of the first and second panels. The vanes to either side of a central vane may be oriented away from vertical.

The vehicle may comprise a duct running from a duct inlet to a duct outlet to permit air flowing into the duct inlet to be channelled to the duct outlet, the duct inlet may be positioned at the front of the nose region below the top surface and the duct outlet being positioned on the top surface of the nose region behind the duct inlet, the duct outlet may be oriented so that air flowing through the duct outlet is directed in an upwards direction, the upwards airflow may cause disruption to a rearward airflow moving towards the passenger compartment; wherein the airflow deflector may be positioned between a front of the nose region and the duct outlet.

The present invention will now be described by way of example with reference to the accompanying drawings. In the drawings.

The following description is presented to enable any person skilled in the art to make and use the invention, and is provided in the context of a particular application.

Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a vehicle comprising: a passenger compartment and a nose region forwards of the passenger compartment, the nose region having a top surface. The vehicle further comprises an airflow deflector positioned on the top surface of the nose region. The airflow deflector comprises a first panel projecting from the top surface of the nose region, and a second panel coupled to the first panel, the second panel being spaced from the first panel to form a channel between the first and second panels. The channel has an inlet facing towards the top surface of the nose region so that a rearwardly moving airflow incident on the first panel is directed towards the channel inlet and an outlet facing away from the top surface of the nose region so that air flowing through the outlet is directed in an upwards direction, the upwards airflow causing disruption to a rearward airflow moving towards the passenger compartment. The upwards airflow causes rearward airflow above the airflow deflector to be directed upwards away from the passenger compartment. The passenger compartment may be roofless. The passenger compartment may have no front windscreen.

Figure 1:
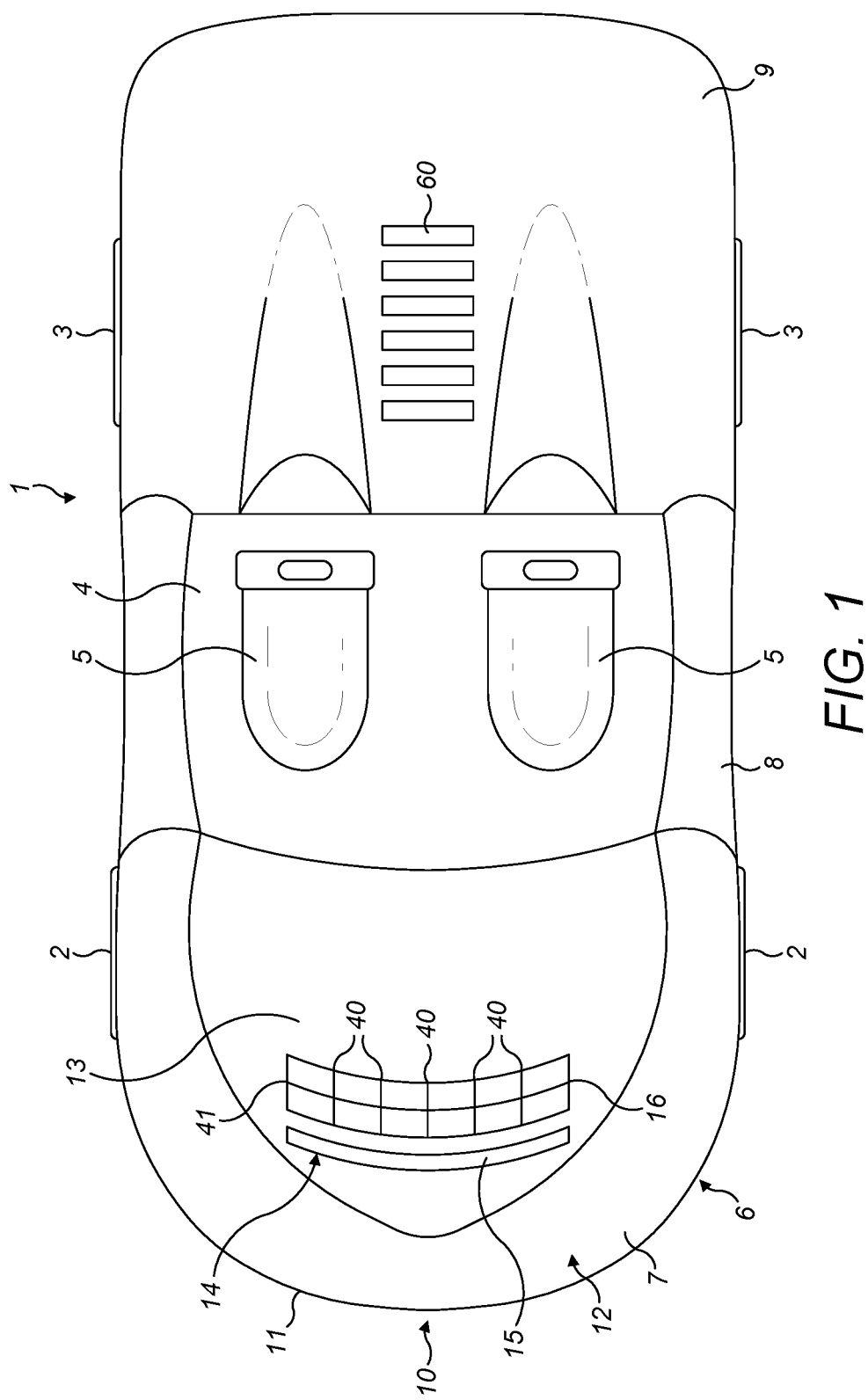
FIG. 1 shows a schematic plan view of a vehicle.

FIG. 1 shows a vehicle 1. The vehicle 1 may be an automobile. The vehicle 1 may be a car. The vehicle 1 pictured in FIG. 1 is a roofless vehicle. The vehicle 1 comprises front wheels 2 and rear wheels 3. The front of the vehicle 1 is defined with reference to the primary motion direction of the vehicle 1. The front of the vehicle 1 points in the primary motion direction of the vehicle. Generally, a vehicle has a primary motion direction that is the forward direction. The vehicle 1 comprises an occupant compartment 4. The occupant compartment 4 may comprise one or more seats 5 for occupants of the vehicle to sit in. The occupant compartment 4 may accommodate a driver. The occupant compartment may accommodate one or more passengers. The vehicle 1 may comprise controls located within the occupant compartment 4 to enable an occupant to control the motion of the vehicle. The occupant compartment 4 may also be known as a passenger compartment. The passenger compartment 4 may have no front windscreen.

The vehicle comprises a vehicle body 6. The vehicle body 6 comprises a plurality of body panels. For example, the body panels may include bonnet panel(s) 7, side door panel(s) 8, and rear deck panel(s) 9. The vehicle body 5 have an outer surface made up of the outer surface of the body panels. The outer surface of the vehicle body defines the exterior surface of the vehicle 1.

The vehicle comprises a nose region 10. The nose region 10 is located forwards of the passenger compartment 4. The front wheels 2 may be located in the nose region 10 of the vehicle 1. The nose region 10 extends from a leading edge 11 of the nose region to the front of the passenger compartment 4. The leading edge 11 of the nose region is the forward-facing front edge of the nose region. The nose region 10 has a front 12 which is the area of the nose region near the leading edge 11 of the nose region 10. The nose region 10 also has a top surface 13. This is the top surface 13 of the nose region 10 exposed to the top of the vehicle. When the vehicle 1 is in forward motion, a rearwardly moving airflow passes over the top surface 13 of the nose region towards the occupant compartment 4.

The vehicle 1 also comprises an airflow redirection device shown generally at 14 in FIG. 1. The airflow redirection device 14 comprises an airflow deflector 15. The airflow redirection device 14 may also comprise a shaped duct, the outlet of which is shown at 16. FIGS. 2 to 5 show the airflow deflector 15 in more detail.

Figure 2:
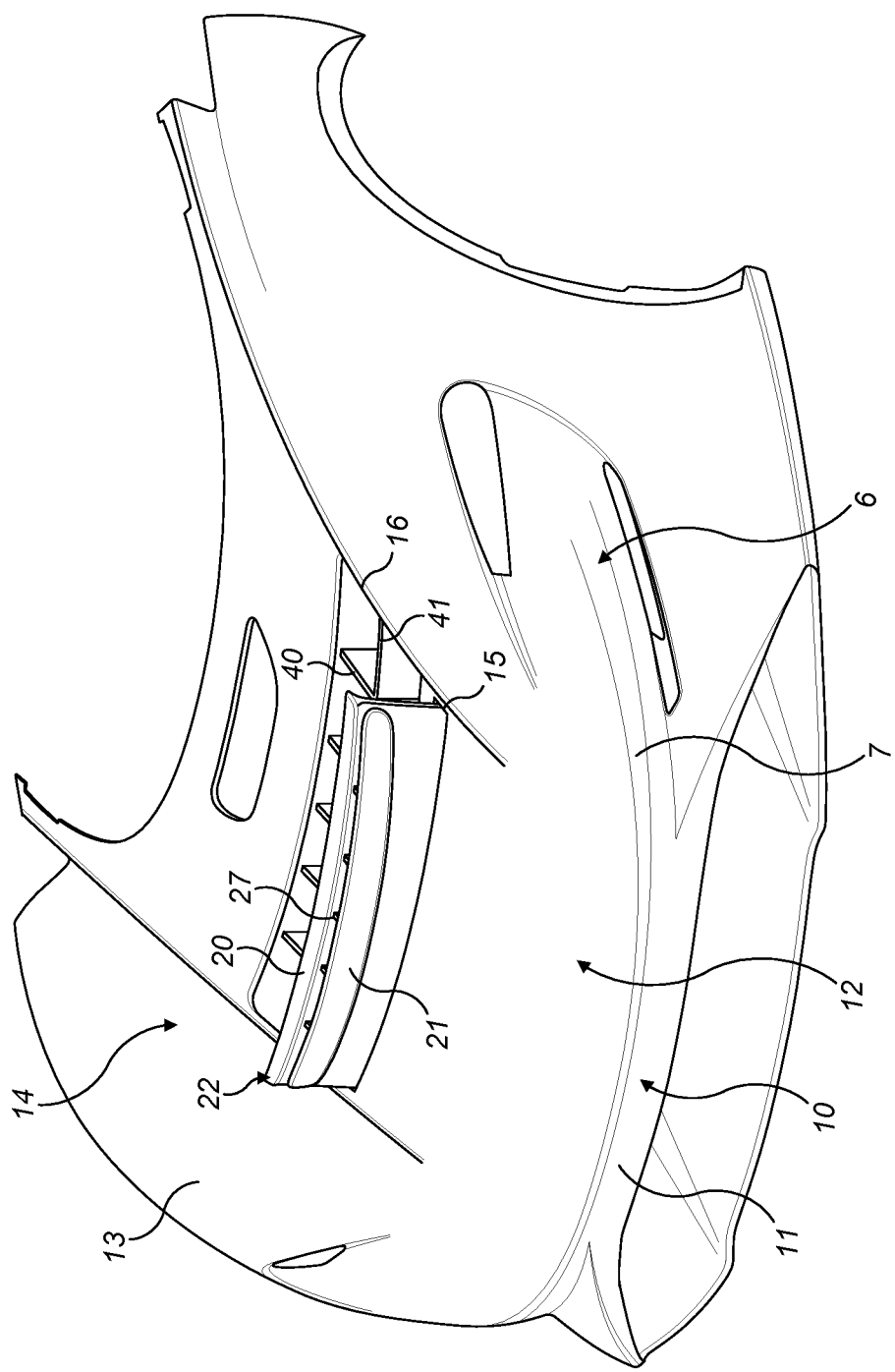
FIG. 2 shows a schematic three-quarters view of a nose region of the vehicle.

FIG. 2 shows a three-quarters view of the nose region 10. In this view, the airflow deflector 15 is shown in a raised configuration. The position of the airflow deflector 15 may be fixed relative to the vehicle body 4, or as advantageously described herein may be moveable between a raised configuration and a lowered configuration. The airflow deflector 15 is positioned on the top surface 13 of the nose region 10. The airflow deflector 15 is positioned in front of the occupant compartment 4. The airflow deflector 15 may be positioned closer to the leading edge 11 of the nose region 10 than to the occupant compartment 4. Where the shaped duct is present, the airflow deflector 15 is positioned between the leading edge 11 of the nose region and the outlet 16. In this case, the airflow deflector 15 is positioned forward of the outlet 16. The airflow deflector 15 projects from the top surface 13 of the nose region 10. The airflow deflector 15 projects in a generally upward direction. The airflow defector 15 as shown in the figures is also slanted slightly towards the occupant compartment 4. The airflow deflector 15 projects from the top surface 13 of the nose region 10 to direct a rearwardly moving airflow over the top surface 13 of the nose region 10 in an upwards direction. The airflow deflector 15 serves to assist in the disruption to the rearward airflow that would otherwise be moving towards the passenger compartment. The airflow deflector 15 runs across the vehicle in the lateral direction of the vehicle. The airflow deflector 15 has a length that runs across the lateral direction of the vehicle 1. The airflow deflector 15 has a width that runs along a generally vertical direction. The airflow deflector 15 has a length that is greater than its width.

The airflow deflector 15 may be moveable between a lowered configuration where the airflow deflector 15 projects minimally from the top surface 13 of the nose region 10 and a raised configuration where the airflow deflector 15 projects maximally from the top surface 13 of the nose region 10. The lowered configuration is shown generally in FIG. 3. The raised configuration is shown generally in FIG. 2. When the airflow deflector 15 is in the lowered configuration it may be housed completely within the nose region. Therefore, the airflow deflector 15 may not project from the top surface when in the lowered configuration.

Figure 4:
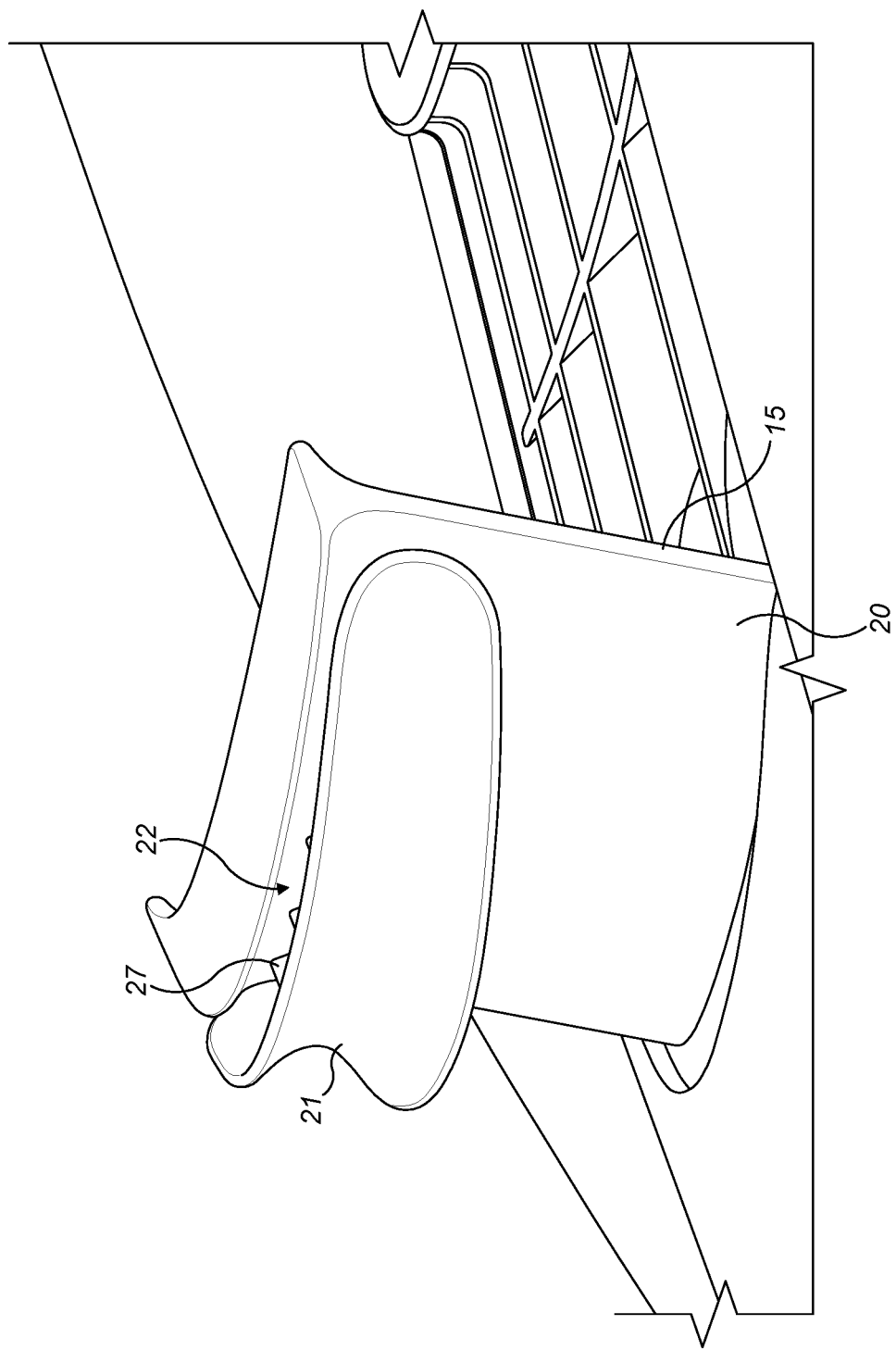
FIG. 4 shows a schematic view of an airflow deflector.

A close up view of the airflow deflector 15 in a raised configuration is shown in FIG. 4. The airflow deflector 15 comprises a first panel 20 and a second panel 21. In FIG. 4, the first panel 20 projects from the top surface 13 of the nose region 10. The first panel 20 therefore provides a connection for the airflow deflector 15 to the body of the vehicle. The first panel 20 may be coupled to the vehicle body 6. The first panel 20 serves to redirect a rearwardly moving airflow moving over the top surface 13 of the nose region 10. The first panel 20 redirects the airflow into an upwards direction.

Figure 5:
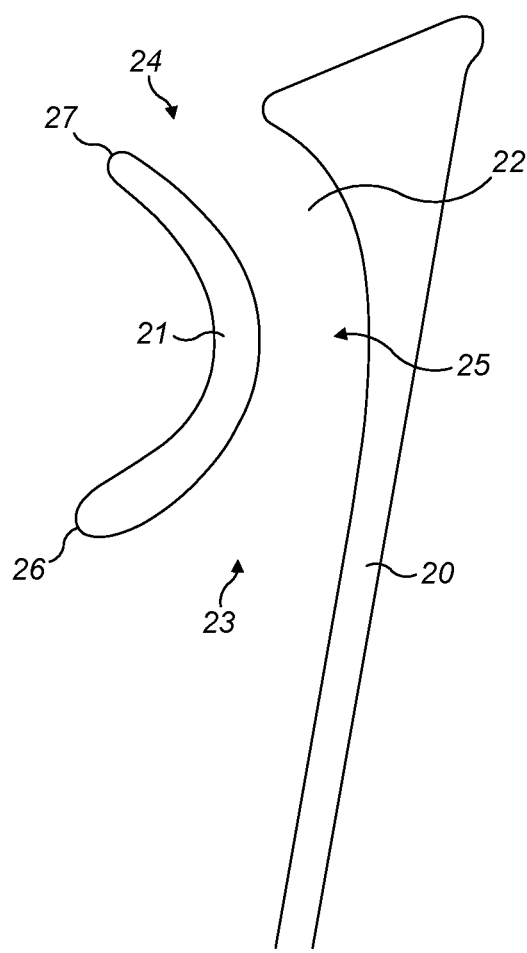
FIG. 5 shows a schematic cut-through view of an airflow deflector.

The second panel 21 is coupled to the first panel 20. The second panel 21 is spaced from the first panel 20. The spacing between the first and second panels creates a channel 22 that runs between the second panel 21 and the first panel 20. The spacing and channel are best seen in FIG. 5. FIG. 5 shows a schematic view of the upper portion of the airflow deflector 15 with both the first and second panels being present. The channel 22 has an inlet 23 that faces towards the top surface 13 of the nose region 10. The channel 22 has an outlet 24 that faces away from the top surface 13 of the nose region 10. The rearwardly moving airflow that is redirected by the first panel 20 in an upwards direction is channelled towards the inlet 23. The airflow that thus passes through the channel 22 is directed to the outlet 24. As the outlet 24 faces away from the top surface 13 of the nose region 10, the outlet 24 directs the air flowing through the channel is an upwards direction. This upwards airflow interacts with a rearwardly moving airflow that is moving towards the occupant compartment 4 to disrupt this airflow moving towards the occupant compartment 4.

The inlet 23 funnels air into the channel 22. The inlet 23 has a width that is greater than the minimum width of channel 22 as it passes from the inlet 23 to the outlet 24. The width of the channel 22 therefore decreases in size as it runs away from the inlet 23. This decrease in width from the inlet 23 causes an acceleration of the airflow through the channel. This is because the volume of air flowing into the inlet either has to compress or move through the channel with greater speed as the channel reduces in width. Whilst some compression of the air may occur the greater effect is on the speed of the air travelling through the channel. This acceleration of the airflow means that the airflow exiting the channel 22 at the outlet 24 may be at a higher speed than at the inlet 23. This further assists in the disruption of a rearwardly moving airflow towards the passenger compartment 4.

The channel 22 has a midpoint 25 long its length. The length of the channel 22 being along the line running between the inlet 23 and the outlet 24. The channel 22 may have a reducing width between the inlet 23 and the channel midpoint 25. The channel 22 may have a constant width between the channel midpoint and the outlet 24.

The channel 22 may be curved. Thus, as shown in FIG. 5, the inlet 23 may be oriented in a forward direction. The inlet 23 may be oriented towards the front of the vehicle. The outlet 24 may be oriented in a forward direction. The outlet 24 may be oriented towards the front of the vehicle. As shown in FIG. 5, the surface of the first panel 20 that faces the channel has a curved profile. The first panel 20 may be shaped so that its depth is greater near the outlet 24. This causes the channel 22 to be curved and the outlet 24 to be oriented in a forward direction. The first panel 20 has generally parallel surfaces in the region near the inlet 23 and from that region to the top surface 13 of the nose region 10.

The second panel 21 may have a curved cross-section as shown in FIG. 5. This causes the channel to be curved. The curvature of the second panel on the side that faces the channel has a radius that causes it to match the curvature of the first panel from the midpoint 25 of the channel to the outlet 24. The first panel 20 may be substantially flat in the region of the first panel 20 near the inlet 23. The straight portion of the first panel 20 combined with the curved second panel 21 causes the width of the channel 20 to be larger at the inlet 23 than further into the channel 20 along the depth of the channel 20.

The second panel 21 has an external side which faces in a generally forward direction. The external side contacts with a rearwardly moving airflow when the vehicle 1 is in motion. The external side of the second panel 21 is curved due to the curved cross-section as shown in FIG. 5. The curved profile causes air that is incident on the second panel 21 to be redirected in an upward direction. In addition, the curved profile guides the airflow that is caught in front on the first panel 20 when the vehicle is in forward motion in an upward direction as not all of the air in front of the first panel 20 can be guided through the channel 22 and so some passes in front of second panel 21.

As pictured in FIG. 5, the edge 26 of the second panel that is closest to the top surface 13 of the nose region 10 may be closer to the leading edge 11 of the nose region 10 than the edge 27 of the second panel that is farthest from the top surface 13 of the nose region 10. The edge 26 of the second panel 21 that is closest to the top surface 13 of the nose region 10 may be described as the lower edge 26. The edge 27 of the second panel 21 that is farthest from the top surface 13 of the nose region 10 may be described as the upper edge 27.

As shown in FIG. 5, the second panel 21 has a cross-section that has an aerofoil profile. The aerofoil is oriented in a vertical orientation. The leading edge of the aerofoil faces the top surface 13 of the nose region 10. Thus, the leading edge is the lower edge 26. The trailing edge of the aerofoil faces away from the top surface 13 of the nose region 10. Thus, the trailing edge is the upper edge 27. The leading edge of the aerofoil is thicker than the trailing edge. The aerofoil profile assists in accelerating the airflow along the second panel and thus assists in accelerating the airflow within the channel 22.

The second panel 21 is coupled to the upper portion of the first panel 20. This means that when the airflow deflector 15 is in a raised configuration, and thus the first panel 20 projects maximally from the top surface 13 of the nose region 10, the second panel 21 is spaced from the top surface 13 of the nose region 10. When the airflow deflector 15 is in a raised configuration, the second panel 21 may be spaced from the top surface 13 of the nose region 10 by an amount that is equal to or greater than the extension of the second panel 21 along the first panel 20. Stated differently, when the airflow deflector is in a raised configuration, the second panel 21 may be spaced from the top surface 13 of the nose region 10 by an amount that is equal or greater than the width of the second panel 21.

The first and second panels each have a length that runs across the lateral direction of the vehicle 1. The first and second panels each have a width that runs along a generally vertical direction. The first and second panels each have a length that is great than its respective width. As shown in FIGS. 1, 2 and 4, the first and second panels are curved along their length. Thus, the central region of the first and second panels are closer to the leading edge 11 of the nose region 10 than the outer sides of the first and second panels along the length of the panels. The first and second panels therefore have an arcuate profile along their respective lengths. The length of the first and second panels may be generally the same. The sides of the first panel 20 may be straight. The edges of the second panel 21 in the lateral direction of the vehicle 1 may be rounded.

Figure 6:
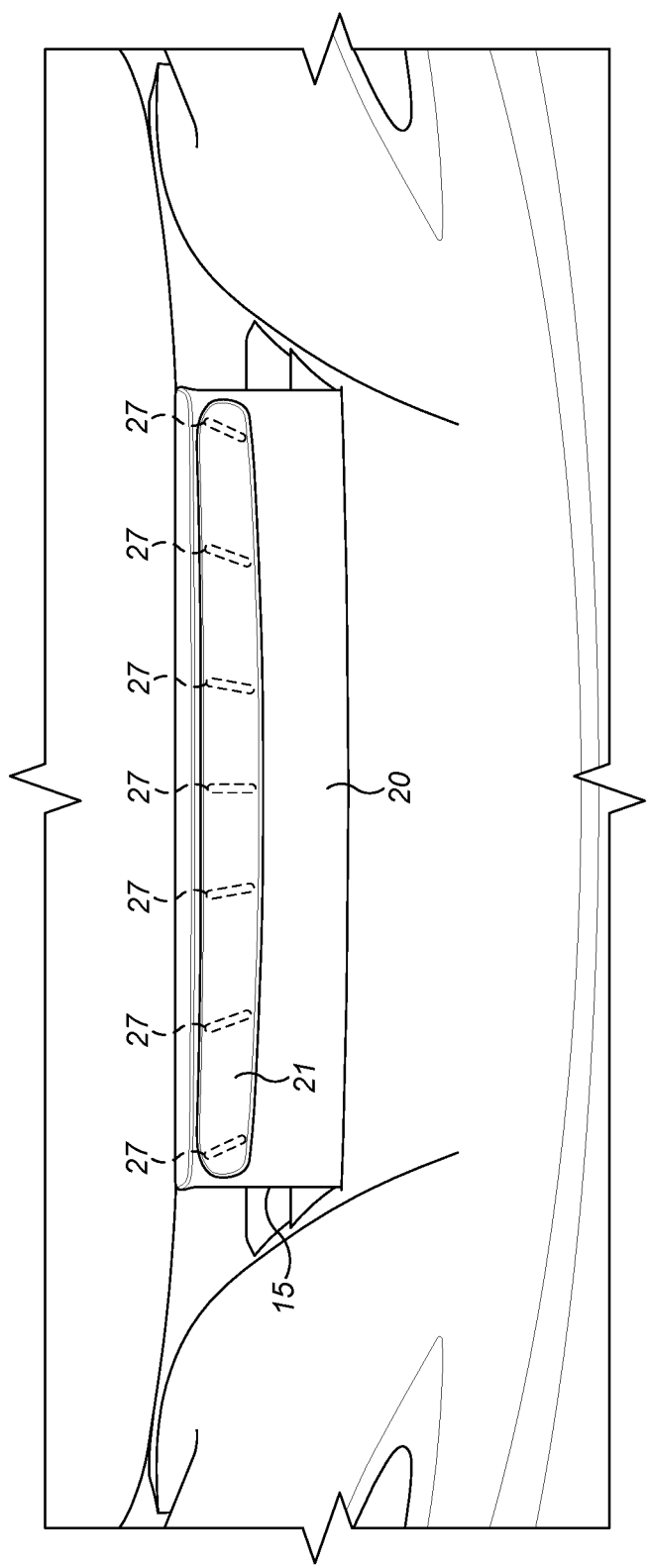
FIG. 6 shows a schematic front-on view of an airflow deflector.

FIG. 6 shows a front view of the airflow deflector 15. In FIG. 6, the second panel 21 has been made transparent so that the connection between the first panel 20 and the second panel 21 can be seen more clearly. The second panel 21 is coupled to the first panel 20 by a series of vanes 27 that run between the first panel 20 and the second panel 21. The vanes 27 are also shown in FIGS. 2 and 4. The vanes 27 are spaced from each other along the lengths of the first and second panels. There may be a central vane with vanes to either side of the central vane. Outer vanes connect between the first and second panels near the lateral edges of the first and second panels. There may be additional vanes located between the central vane and the outer vanes. The airflow deflector 15 may comprise a plurality of vanes 27. The airflow deflector 15 may comprise 3, 4, 5, 6, 7, 8, 9 or 10 vanes. In the case that a central vane is present advantageously there will be an equal number of vanes 27 to each side of the central vane. As shown in FIG. 6, there may be three vanes 27 to each side of the central vane.

As shown in FIG. 6, the vanes to either side of a central vane are oriented away from the vertical with the outer vanes at a more oblique angle than the more central ones. In this way, the vanes 27 are oriented to spread the upwards airflow in the lateral direction of the vehicle 1.

The airflow deflector 15 is moveable between a lowered configuration where the airflow deflector 15 projects minimally from the top surface 13 of the nose region 10 and a raised configuration where the airflow deflector 15 projects maximally from the top surface 13 of the nose region 10. The airflow deflector 15 may move along a direction defined by the width of the airflow deflector 15. The airflow deflector 15 may move along a direction defined by the width of the first panel 20. The lowered configuration is shown generally in FIG. 7. The raised configuration is shown generally in FIGS. 2 to 4 and 6. When the airflow deflector 15 is in the lowered configuration it may be housed completely within the nose region 10. Therefore, the airflow deflector 15 may not project from the top surface when in the lowered configuration.

The airflow deflector 15 may be translucent. This is advantageous because when the airflow deflector 15 projects from the nose region 10 it may be in the eye line of the driver and obstruct the driver seeing the nose of the vehicle. Therefore, this means that the driver can still see the nose of the vehicle even when the airflow deflector is in the raised configuration. Alternatively, the airflow deflector 15 may be non-transparent. This may be advantageous because a non-transparent panel may be capable of being made stronger than a transparent panel due to there not being such a restriction on the type of material used and/or the thickness of the panel. This may improve the ability of the airflow deflector 15 to change the path of the airflow because it is less likely to change shape when airflow is incident on it.

The airflow deflector 15 may be supported by runners 34. There may be one runner to each side of the air flow deflector which permit the airflow deflector 15 to move between the raised and lowered configurations. The airflow deflector 15 may be moved by an actuator 35.

Figure 7:
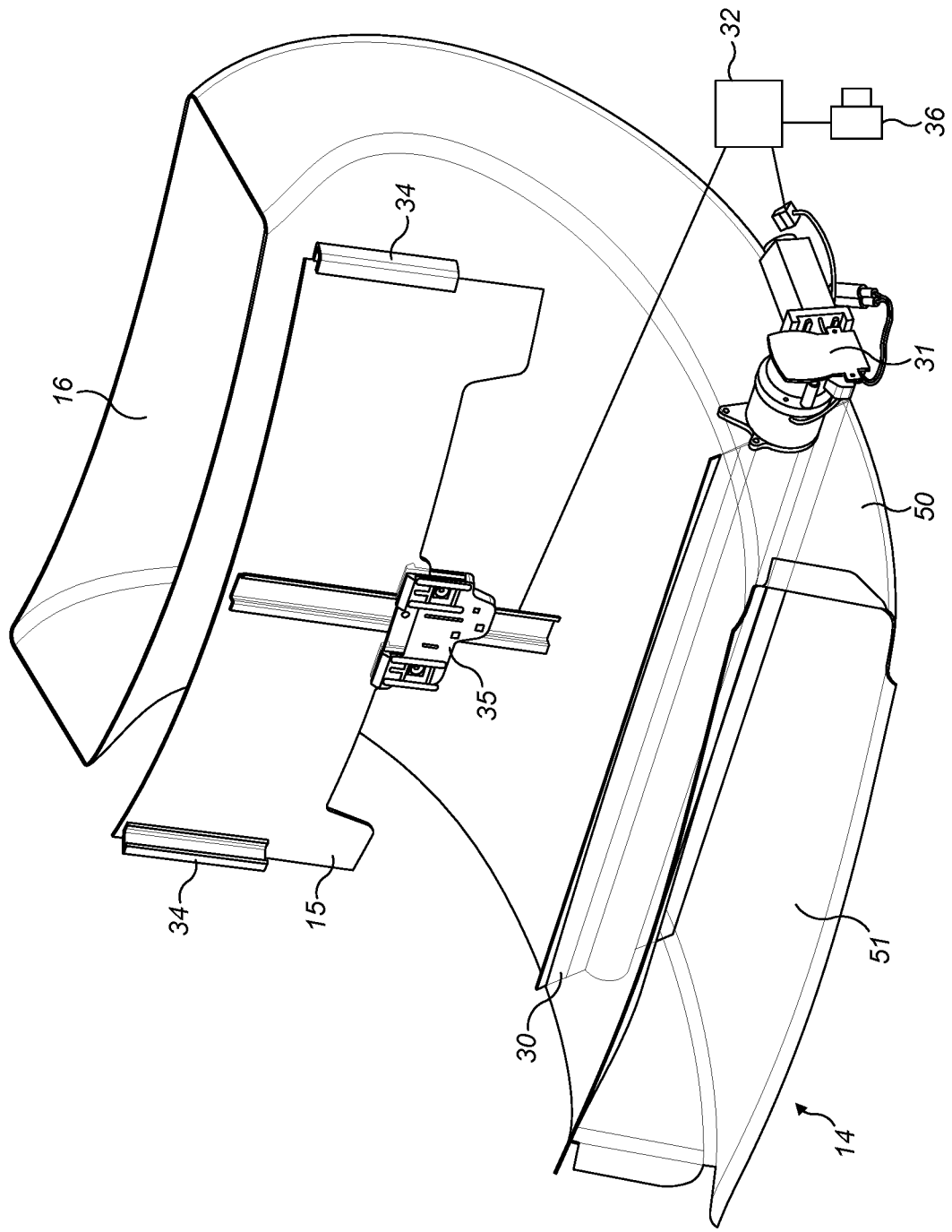
FIG. 7 shows a schematic three-quarters view of an airflow redirection device and an airflow deflector.

The actuator 35 may be an electric motor and a track as pictured in FIG. 7. The electric motor drives against the track to cause movement of the airflow deflector 15. The actuator 35 may be a linear actuator. The actuator 35 is connected to a control unit 32. The control unit 32 provides control signals to the actuator 35 to control the movement of the airflow deflector 15 between the two configurations. The control unit 32 may be a discrete device or may be part of a more general vehicle control unit.

The actuator 35 may be an electric motor and a linkage mechanism. The linkage mechanism, when driven by the motor, may cause the airflow deflector 15 to move between the raised and lowered configurations. The linkage mechanism may be a four-bar link which is configured to provide a force along the movement direction of the airflow deflector 15 to the airflow deflector 15. The electric motor is attached to one link of the four-bar link to move the linkage mechanism to provide the force to the airflow deflector 15.

Figure 8:
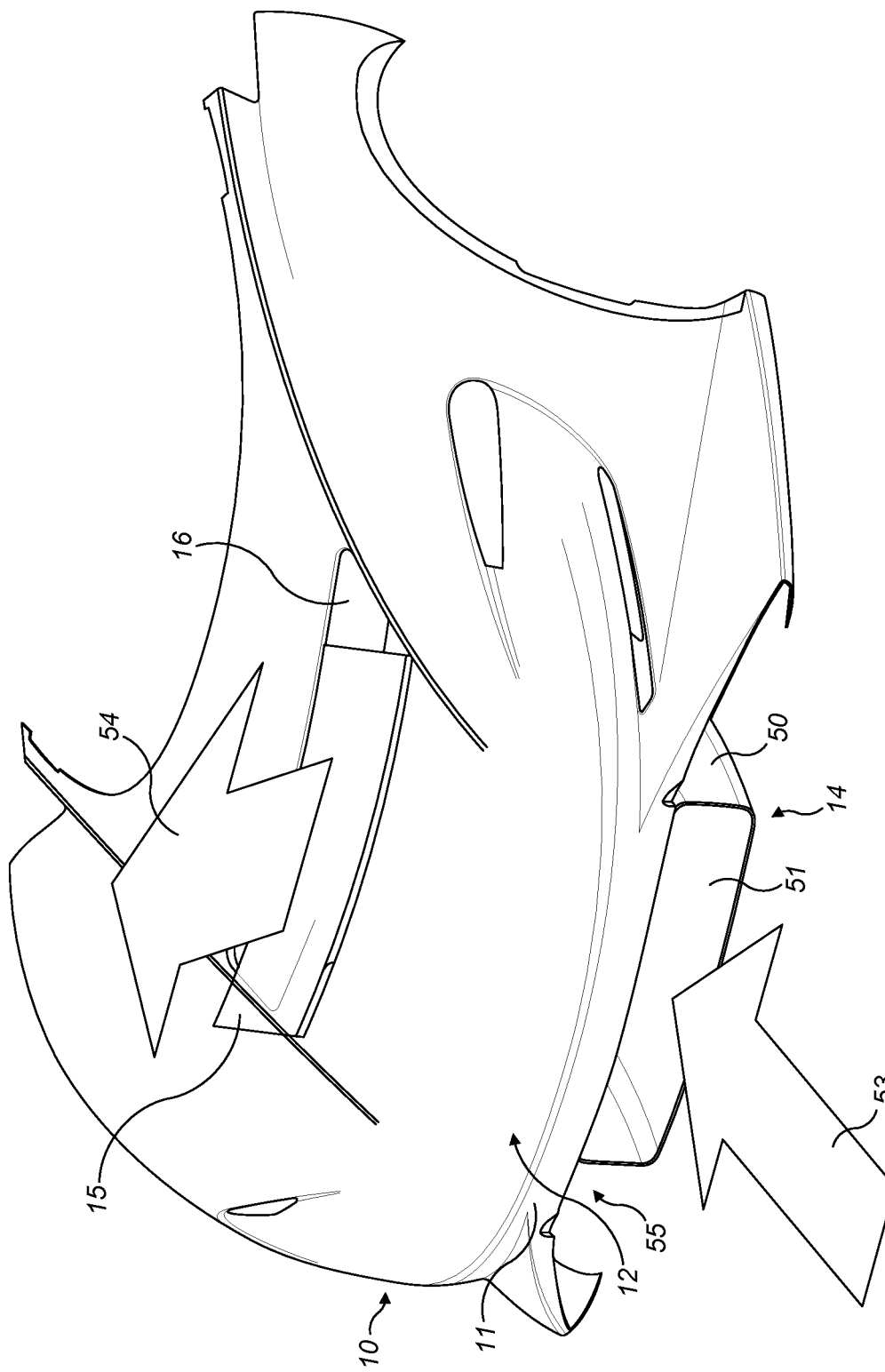
FIG. 8 shows a schematic three-quarters view of a nose region of the vehicle.

FIG. 7 shows a three-quarters view of one example of the main parts of the airflow redirection device 14 without the rest of the vehicle 1. FIG. 8 shows a three-quarters view of the nose region 10.

The airflow redirection device 14 may also comprise a shaped duct 50, the outlet of which is shown at 16. These parts of the airflow redirection device 14 are mostly housed within the vehicle body 6 and so the majority of the device cannot be seen in FIG. 1 but can be seen in FIG. 7 and some detail in FIG. 8.

Figure 3:
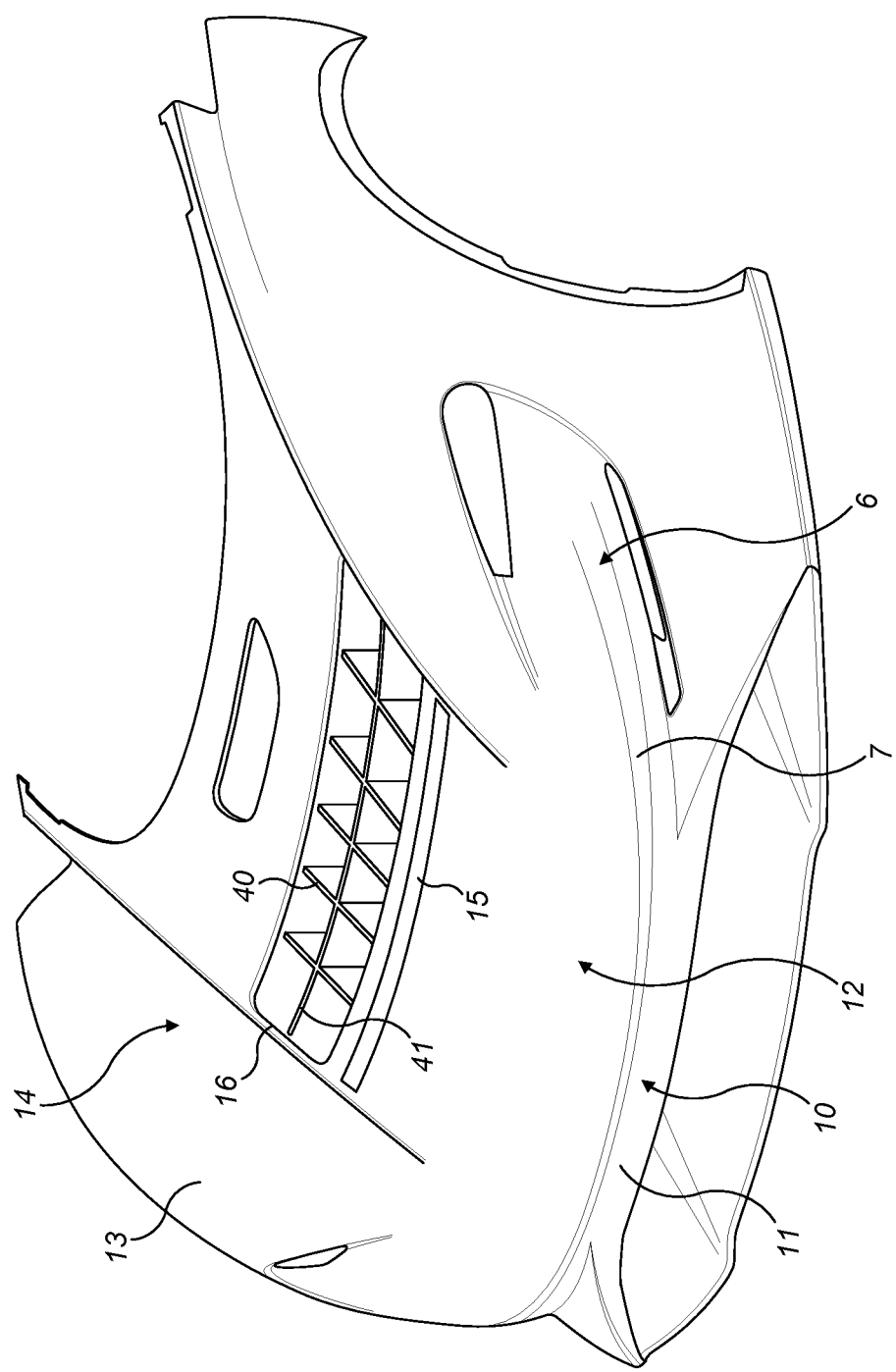
FIG. 3 shows a schematic three-quarters view of a nose region of the vehicle.

The vehicle 1 comprises a duct 50 that runs from an inlet 51 to an outlet 16. The duct 50 permits air flowing into the inlet 51, shown by arrow 53, to be channelled to the outlet 16. The air flows out of outlet 16, as shown by arrow 54. The duct 50 runs through the vehicle body. The inlet 51 is best shown in FIG. 8 with reference to the rest of the vehicle 1. In FIGS. 2 and 3, which focus on the airflow deflector 15, the inlet 51 is not shown in as much detail but it will be appreciated may still be present.

The nose region 10 has an underside 55. The underside 55 is located opposite to the top surface 13 of the nose region 10. The inlet 51 is positioned at the front 12 of the nose region 10. The inlet 51 is positioned towards the underside of the vehicle 1. As in, the inlet 51 is positioned between the underside 55 of the nose region 10 and the running surface of the vehicle 1 on which the wheels 2, 3 sit. In this way, the inlet 51 is positioned below the top surface 13 of the nose region 10 at the front 12 of the nose region 10. The inlet 51 is positioned below the leading edge 11 of the nose region 10. The inlet 51 is positioned behind the leading edge 11 of the nose region 10.

When the vehicle 1 is in forward motion, a rearwardly moving airflow is incident on the vehicle 1. Some of this rearwardly moving airflow will be directed into the duct 50 by the inlet 51. The inlet 51 runs across the front of the vehicle 1. The inlet 51 has a length that runs across the vehicle 1 in the lateral direction of the vehicle 1. The inlet 51 has a width that runs along a generally vertical direction. The inlet 51 has a length that is greater than its width. The length of the inlet 51 is at least three times the width of the inlet 51. By positioning the inlet 51 at the front and to the underside of the nose region 10, the inlet 51 can run across a substantial portion of the front of the vehicle 1 without being visually intrusive. This means that it can collect more airflow than would be possible if it was located, for example, on the top surface 13 of the nose region 10. In addition, it collects air that has started to be forced underneath the vehicle 1, this means that the air is at higher pressure meaning the mass of air directed into the duct 50 is greater than might be the case if the inlet 51 was located on the top surface 13 of the nose region 10. The low position of inlet 51 also means that there is more vertical space for the duct 50 which will be shown to be advantageous when discussing outlet 16.

The outlet 16 is positioned on the top surface 13 of the nose region 10. The outlet 16 is positioned in front of the occupant compartment 4. The outlet 16 has a length that runs across the vehicle 1 in the lateral direction of the vehicle 1. The outlet 16 has a width that runs along the longitudinal direction of the vehicle 1. The outlet 16 has a length that is greater than its width. The length of the outlet 16 is at least three times the width of the outlet 16.

As shown in FIGS. 1 and 2, the outlet 16 may be positioned closer to the leading edge 11 of the nose region 10 than to the occupant compartment 4. The outlet 16 is positioned to the rear of inlet 51. The air flows through the duct 50 from the inlet 51 to the outlet 16. The outlet 16 is oriented so that air flowing through and out of the outlet 16 is directed in an upwards direction as shown by arrow 54. The airflow exiting the outlet 16 causes rearward airflow, generated by forward motion of the vehicle, that did not enter the inlet 51 and instead flowed over the top surface 13 of the nose region 10 towards the occupant compartment 4 to be directed upwards away from the occupant compartment 4. The upwards airflow exiting the outlet 16 acts on the rearwardly moving airflow moving over the top of the vehicle 1 to push that airflow upwards away from the occupant compartment. In this way, it can cause a disruption to the rearward airflow moving towards the passenger compartment 4. The rearward airflow moving across the top of the vehicle is deflected upwards away from the passenger compartment 4.

The outlet 16 may be oriented so that the air flowing through and out of the outlet 16 is directed in a generally vertical direction. However, it has been identified that a greater deflection of the rearward airflow can be achieved if the outlet 16 is oriented so that the air flowing out of the outlet 16 is directed in a forward direction as well as in an upward direction. Thus, advantageously the outlet is oriented so that air flowing through the outlet is directed away from the passenger compartment. The outlet may be oriented so that the air flowing through the outlet is directed at approximately a 45-degree angle towards the front of the vehicle. Thus, the air is directed in both an upwards and forwards direction in equal magnitude. The outlet may be oriented so that the air flowing through the outlet is directed at approximately a 5, 10, 15, 20, 25, 30, 35 or 40-degree angle towards the front of the vehicle. The angles may be measured from vertical.

The shape of duct 50 is shown in FIG. 7. FIG. 7 shows a three-quarters view of the main parts of the airflow redirection device 12 without the rest of the vehicle 1. The duct 50 is shaped to redirect the air flowing into the inlet 51 to the orientation of the outlet 16. The duct 50 is curved along its length to change the direction of the airflow from the orientation of the inlet 51 to the orientation of the outlet 16. The duct 50 may have a decreasing radius of curvature as it runs from the inlet 51 to the outlet 16. This serves to accelerate the change in direction of the airflow as it approaches the outlet 16. The low position of the inlet 51 means that there is more room for the duct 50 to change direction of the airflow compared to having the inlet 51 on the top surface 13 of the nose region 10. The duct 50 may be arcuate along the direction that runs across the vehicle 1. The duct 50 may be arcuate towards the end of the duct 50 near the outlet 16 and generally straight-sided towards the end of the duct 50 near the inlet 51.

The duct 50 may comprise a variable restriction 30. The restriction 30 is moveable between a first position in which airflow through the duct 50 is substantially unimpeded and a second position in which airflow through the duct 50 is substantially impeded. The restriction 30 may seal against the walls of the duct 50 when in the second position to stop air flowing past the restriction 30. It will be appreciated that if the restriction 30 remains in the duct when in the first position then it may have an effect of the airflow through the duct but that this effect should be at a minimum when the restriction 30 is in the first position.

Figure 9:
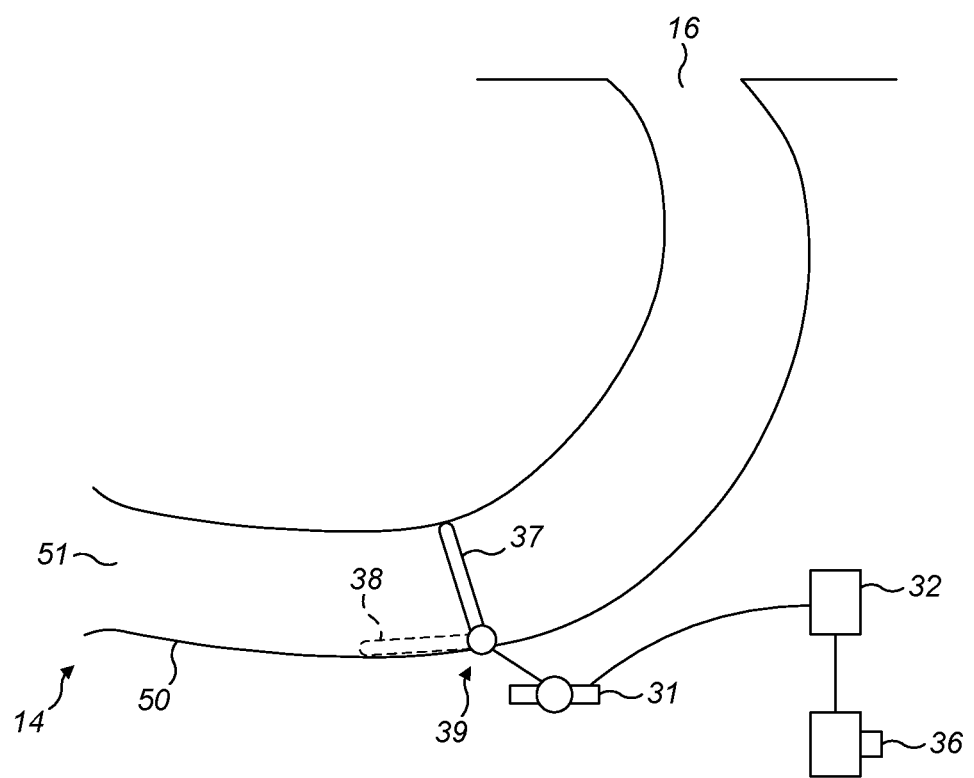
FIG. 9 shows a schematic cut through view of the airflow redirection device.

The restriction 30 may comprise a flap 39 as shown in FIG. 9. The flap 39 is attached to one surface of the interior of the duct and is caused to extend across the duct 16 when in the second position 37 and be substantially aligned with the surface that the flap 39 is attached to when in the first position 38.

The restriction 30 may comprise a valve as shown in FIG. 7. The valve rotates to move between the first and second positions. In the first position, the valve is positioned generally in line with the flow of air through the duct 50 so cause minimum disruption to air flowing through the duct 50. In the second position, the valve extends across the duct 50 to substantially seal the duct 50 to air flowing through the duct 50.

The restriction 30 may be moved by an actuator 31. The actuator 31 may be any suitable device for causing movement to the restriction 30. The actuator 31 may be an electric motor as shown in FIGS. 7 and 9. The actuator 31 is connected to a control unit 32. The control unit 32 provides control signals to the actuator 31 to control the movement of the restriction 30 between the two positions. As discussed in relation to the actuator 25, the control unit 32 may be a discrete device or may be part of a more general vehicle control unit. There may be a separate control unit for each of actuators 31 and 35.

The airflow redirection device 12 may comprise some or all of the duct 50, inlet 51, outlet 16 and associated components.

The actions of the airflow through the duct 50 and the airflow deflector 33 on rearwardly moving airflow are complimentary. Therefore, the opening of the duct 50 and the raising of the airflow deflector 33 can be coordinated by the control unit 32. The control unit 32 may cause the restriction 30 to move to the first position and the airflow deflector 33 to move to the raised configuration when the control unit 32 receives a control signal indicating that airflow disruption for the occupant compartment 4 is required. The control unit 32 may cause the restriction 30 to move to the second position and the airflow deflector 33 to move to the lowered configuration when the control unit 32 receives a control signal indicating that airflow disruption for the occupant compartment 4 is not required. The control signal may be provided by a button 36 in the occupant compartment 4. The button 36 may be positioned so that it can be controlled by the driver of the vehicle 1. The button 36 may be a physical control or may be a control integrated into the vehicle user interface, such as a touch screen. The control signal may be the current speed of the vehicle 1. The control unit 32 may cause the restriction 30 to move to the restrictions 30 to move to the first position and the airflow deflector 33 to move to the raised configuration when the control unit 32 receives a control signal indicating that the current speed of the vehicle 1 is at or above a first predefined speed. The control unit 32 may cause the restriction to move to the second position and the airflow deflector 33 to move to the lowered configuration when the control unit 32 receives a control signal indicating that the current speed of the vehicle 1 is at or below a second predefined speed. The first and second predefined speeds may be the same. However, advantageously the first and second predefined speeds may be different by a small amount so that the restriction 30 and airflow deflector 33 do not continually switch between their two states when the car is driven around the first predefined speed. Alternatively, the control unit may cause the restriction 30 and airflow deflector 33 in response to the current speed being to one side of the predefined speeds for longer than a predefined time delay. In the case that one the restriction 30 is present and not the airflow deflector 33 then the control unit 32 may control only the restriction 30 in the manner described above with reference to both the restriction 30 and the airflow deflector 33.

The first predefined speed may be 25 mph, 30 mph, 35 mph, 40 mph or 45 mph. The second predefined speed may be 25 mph, 30 mph, 35 mph, 40 mph or 45 mph. The first and second predefined speeds may differ by 1 mph, 2 mph, 3 mph, 4 mph or 5 mph. The predefined time delay may be 5 seconds, 10 seconds or 15 seconds.

As shown in FIGS. 1 to 3, the outlet 50 may comprise vanes that assist in directing the flow of air exiting the outlet. The outlet may comprise two sets of vanes 40, 41.

A first set of vanes 40 runs along the width of the outlet 16. These vanes 40 are spaced from each other along the length of the outlet. The distance between each of the vanes 40 at the outer edge of the outlet 16 is generally the same. The vanes to either side of a central vane may curve outwards along their length from being positioned inside the duct 50 to the edge of the outlet 16 exposed to the top surface 13 of the nose region 10. In this way, the first set of vanes are oriented to spread the upwards airflow in the lateral direction of the vehicle. The first set of vanes spread the upwards airflow along the direction of the length of the outlet 16. This can be advantageous because in most vehicles the nose region 10 has a width that is less than the width of the occupant compartment 4. Therefore, for the outlet 16 to disrupt the airflow in regions outside of its width it needs to project the air emerging from the outlet 16 outwards towards the side edges of the vehicle 1. The first set of vanes 40 may comprise any number of vanes. Preferably, the first set of vanes 40 comprises three vanes, four vanes, five vanes, six vanes or seven vanes. The first set of vanes 40 may comprise five vanes as pictured in FIGS. 1 to 3. An equal number of vanes may be positioned to each side of a central vane. In the case of five vanes 40, two vanes may be to each side of a central vane.

A second set of vanes 41 may run along the length of the outlet 16. The second set of vanes 41 may comprise any number of vanes. In the case of the configuration shown in FIG. 1 there is only one central vane in the outlet 16. However, there may be multiple vanes 41 spaced from each other along the width of the outlet. In this case, the distance between each of the vanes 41 may be generally the same. Preferably, the second set of vanes 41 may comprise two vanes, three vanes or four vanes. Advantageously, the second set of vanes 41 comprises two vanes. The vane(s) 41 may be curved to match the curved profile of the duct 50. In this way, the second set of vanes are oriented to direct air flowing through the outlet in an upwards direction and away from the passenger compartment. The second set of vanes 41 may project further into the duct 50 than the first set of vanes 40. Alternatively, the second set of vanes 41 may project the same distance into the duct 50 as the first set of vanes 40 or the first set of vanes 40 may project further into the duct 50 than the second set of vanes 41.

The vehicle 1 may comprise a stub-windscreen. The stub-windscreen may be a projection from the vehicle body 6 in front of the occupant compartment 4. The stub-windscreen may project only a short distance from the vehicle body 6, less than a normal windscreen. The stub-windscreen may project from the vehicle body 6 by a distance less than that needed to cover the face of a normal sized occupant in the occupant compartment. The stub-windscreen may also cause a rearwardly moving airflow to be directed over the occupant cabin, again disrupting the rearward flow of air over the middle of the vehicle 1. Alternatively, as pictured in the figures, the passenger compartment may have no front windscreen.

The combined effect of the airflow redirection device 12 and the airflow deflector 33 is that the upward airflow generated by the airflow redirection device 12 and the airflow deflector 33 cause the rearward airflow incident on the vehicle 1 to be pushed upwards and go on to flow over the occupant compartment 4. This means that the airflow is disrupted in the region of the occupant compartment 4. Therefore, rather than being subjected to the full force of that rearward airflow only a proportion of it reaches the occupant compartment 4. When the airflow redirection device 12 and the airflow deflector 33 are both inactive, the rearward airflow can now go on to fully impinge on the occupant compartment meaning that helmets may be required.

The vehicle 1 may comprise an internal combustion engine, shown generally at 60 below the illustrated vents. The system for redirecting airflow may be particularly advantageous on a mid-engined or rear-engined vehicle. Thus, the vehicle 1 may be a mid-engined or rear-engined vehicle. This is because it means that the nose region can be free from engine related components or alternatively at least free from any large engine related components such as radiators. Being free from these engine related components means that there is space for the airflow redirection device 12 herein described. The vehicle 1 may be a hybrid vehicle and so comprise at least one electric motor providing motive power to the vehicle together with an internal combustion engine. The vehicle 1 may be an electric vehicle and so derive motive power solely from electric motors.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle comprising:
a passenger compartment;
a nose region forwards of the passenger compartment, the nose region having a top surface; and
an airflow deflector positioned on the top surface of the nose region, the airflow deflector comprising:
a first panel projecting from the top surface of the nose region; and a second panel coupled to the first panel, the second panel being spaced from the first panel to form a channel between the first and second panels, the channel having an inlet facing towards the top surface of the nose region so that a rearwardly moving airflow incident on the first panel is directed towards the channel inlet and an outlet facing away from the top surface of the nose region so that air flowing through the outlet is directed in an upwards direction, the upwards airflow causing disruption to a rearward airflow moving towards the passenger compartment; and wherein the outlet of the channel is oriented in a forward direction.

2. A vehicle according to claim 1, wherein the airflow deflector is moveable between a lowered configuration and a raised configuration, the airflow deflector projecting minimally from the top surface of the nose region when in the lowered configuration and the airflow deflector projecting maximally from the top surface of the nose region when in the raised configuration.

3. A vehicle according to claim 2, wherein the airflow deflector is housed completely within the nose region when in the lowered configuration.

4. A vehicle according to claim 2, wherein the airflow deflector is moveable between the lowered configuration and the raised configuration by sliding relative to the top surface of the nose region in an upward direction.

5. A vehicle according to claim 1, wherein the channel has a length running between the inlet of the channel and the outlet of the channel, the channel has a minimum width along the length of the channel running between the first and second panels, and the inlet has a width greater than the minimum width of the channel.

6. A vehicle according to claim 1, wherein the channel has a length running between the inlet of the channel and the outlet of the channel, the channel has a width running between the first and second panels, and the channel has a reducing width between the inlet and a midpoint of the length of the channel.

7. A vehicle according to any claim 1, wherein the channel has a length running between the inlet of the channel and the outlet of the channel, the channel has a width running between the first and second panels, and the channel has a constant width between a midpoint of the length of the channel and the outlet.

8. A vehicle according to claim 1, wherein the channel has a length running between the inlet of the channel and the outlet of the channel, and the channel is curved along the length of the channel.

9. A vehicle according to any claim 1, wherein the inlet of the channel is oriented in a forward direction.

10. A vehicle according to claim 1, wherein the second panel has a curved cross-section, a leading edge of the second panel defines one side of the inlet of the channel, a trailing edge of the second panel defines one side of the outlet of the channel and an intermediate portion between the leading and trailing edges, the leading and trailing edges of the second panel being positioned closer to a front of the vehicle than the intermediate portion of the second panel.

11. A vehicle according to claim 1, wherein the second panel has a cross-section that has an aerofoil profile, a leading edge of the aerofoil faces the top surface of the nose region and a trailing edge of the aerofoil faces away from the top surface of the nose region and the leading edge of the aerofoil is thicker than the trailing edge of the aerofoil.

12. A vehicle according to claim 1, wherein the second panel is coupled to the first panel so that the second panel is spaced from the top surface of the nose region when the first panel projects from the top surface of the nose region.

13. A vehicle according to claim 1, wherein the second panel is connected to the nose region via the first panel.

14. A vehicle according to claim 1, wherein the first panel has a cross-section with a depth greater near the outlet of the channel than the inlet of the channel.

15. A vehicle according to claim 1, wherein a surface of the first panel which faces the channel is at least partially curved.

16. A vehicle according to claim 1, the first and second panels being arcuate along a lateral direction of the vehicle.

17. A vehicle according to claim 1, wherein the airflow deflector comprises one or more vanes, the vane(s) coupling the second panel to the first panel.

18. A vehicle according to claim 1, wherein the airflow deflector comprises a plurality of vanes, each vane being spaced from each other along a length of the first and second panels and the vanes to either side of a central vane are oriented away from vertical.

19. A vehicle according to claim 1, the vehicle comprising a duct running from a duct inlet to a duct outlet to permit air flowing into the duct inlet to be channelled to the duct outlet, the duct inlet being positioned at the front of the nose region below the top surface and the duct outlet being positioned on the top surface of the nose region behind the duct inlet, the duct outlet being oriented so that air flowing through the duct outlet is directed in an upwards direction, the upwards airflow causing disruption to a rearward airflow moving towards the passenger compartment; and wherein the airflow deflector is positioned between a front of the nose region and the duct outlet.

20. A vehicle comprising:
a passenger compartment;
a nose region forwards of the passenger compartment, the nose region having a top surface; and
an airflow deflector positioned on the top surface of the nose region, the airflow deflector comprising
a first panel projecting from the top surface of the nose region; and
a second panel coupled to the first panel, the second panel being spaced from the first panel to form a channel between the first and second panels,
the channel having an inlet facing towards the top surface of the nose region so that a rearwardly moving airflow incident on the first panel is directed towards the channel inlet and an outlet facing away from the top surface of the nose region so that air flowing through the outlet is directed in an upwards direction, the upwards airflow causing disruption to a rearward airflow moving towards the passenger compartment; and
wherein the airflow deflector is moveable between a lowered configuration and a raised configuration, the airflow deflector projecting minimally from the top surface of the nose region when in the lowered configuration and the airflow deflector projecting maximally from the top surface of the nose region when in the raised configuration.

21. A vehicle according to claim 2, wherein the airflow deflector is housed completely within the nose region when in the lowered configuration.

22. A vehicle according to claim 2, wherein the airflow deflector is moveable between the lowered configuration and the raised configuration by sliding relative to the top surface of the nose region in an upward direction.

23. A vehicle comprising:
a passenger compartment;
a nose region forwards of the passenger compartment, the nose region having a top surface; and
an airflow deflector positioned on the top surface of the nose region, the airflow deflector comprising
a first panel projecting from the top surface of the nose region; and
a second panel coupled to the first panel, the second panel being spaced from the first panel to form a channel between the first and second panels,
the channel having an inlet facing towards the top surface of the nose region so that a rearwardly moving airflow incident on the first panel is directed towards the channel inlet and an outlet facing away from the top surface of the nose region so that air flowing through the outlet is directed in an upwards direction, the upwards airflow causing disruption to a rearward airflow moving towards the passenger compartment; and
wherein the second panel has a curved cross-section, a leading edge of the second panel defines one side of the inlet of the channel, a trailing edge of the second panel defines one side of the outlet of the channel and an intermediate portion between the leading and trailing edges, the leading and trailing edges of the second panel being positioned closer to a front of the vehicle than the intermediate portion of the second panel.

* * * * *